(12) United States Patent
Henriksson et al.

(10) Patent No.: US 10,967,826 B2
(45) Date of Patent: Apr. 6, 2021

(54) AIR BAG DEVICE AND VEHICLE SEAT PROVIDED WITH AN AIR BAG DEVICE

(71) Applicants: Ola Henriksson, Vårgårda (SE); Stephane Pretot, Lerum (SE); Mikaela Hägg, Alingsås (SE); Malin Leijer, Vara (SE); Fredrik Kjell, Alingsås (SE); Guillaume Alenspach, Martainville Epreville (FR); Jack Kroll, Vårgårda (SE); Jules Houessou, Gothenburg (SE)

(72) Inventors: Ola Henriksson, Vårgårda (SE); Stephane Pretot, Lerum (SE); Mikaela Hägg, Alingsås (SE); Malin Leijer, Vara (SE); Fredrik Kjell, Alingsås (SE); Guillaume Alenspach, Martainville Epreville (FR); Jack Kroll, Vårgårda (SE); Jules Houessou, Gothenburg (SE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 32 days.

(21) Appl. No.: 16/471,045

(22) PCT Filed: Dec. 15, 2017

(86) PCT No.: PCT/EP2017/083175
§ 371 (c)(1),
(2) Date: Jun. 19, 2019

(87) PCT Pub. No.: WO2018/114723
PCT Pub. Date: Jun. 28, 2018

(65) Prior Publication Data
US 2020/0114858 A1    Apr. 16, 2020

(30) Foreign Application Priority Data
Dec. 22, 2016 (SE) .................................. 1651736-9

(51) Int. Cl.
*B60R 21/207*    (2006.01)
*B60R 21/231*    (2011.01)
(Continued)

(52) U.S. Cl.
CPC .......... *B60R 21/207* (2013.01); *B60R 21/235* (2013.01); *B60R 21/23138* (2013.01);
(Continued)

(58) Field of Classification Search
CPC ........................ B60R 21/207; B60R 21/23138
See application file for complete search history.

(56) References Cited

U.S. PATENT DOCUMENTS

| 5,464,246 A | 11/1995 | Castro et al. |
| 8,485,551 B2 * | 7/2013 | Dainese ................ B60R 21/207 |
| | | 280/730.2 |

(Continued)

FOREIGN PATENT DOCUMENTS

| EP | 2546111 A1 | 1/2013 | |
| FR | 2927592 A1 * | 8/2009 | ........... B60R 21/207 |

(Continued)

OTHER PUBLICATIONS

International Search Report and Written Opinion issued in PCT/EP2017/083175, dated Mar. 8, 2018; ISA/EP.

*Primary Examiner* — Faye M Fleming
(74) *Attorney, Agent, or Firm* — Stephen T. Olson; Harness, Dickey & Pierce, P.L.C.

(57) ABSTRACT

An air bag device for a vehicle seat has a first air bag portion to be attached to at or close to a first lateral side of a backrest and a second air bag portion to be attached to a second lateral side of a backrest. The first air bag portion and second air bag portion are connected with each other by a third air bag portion designed to be located along a part of the upper portion of a backrest. The air bag device is designed to, when (Continued)

Figure 1:
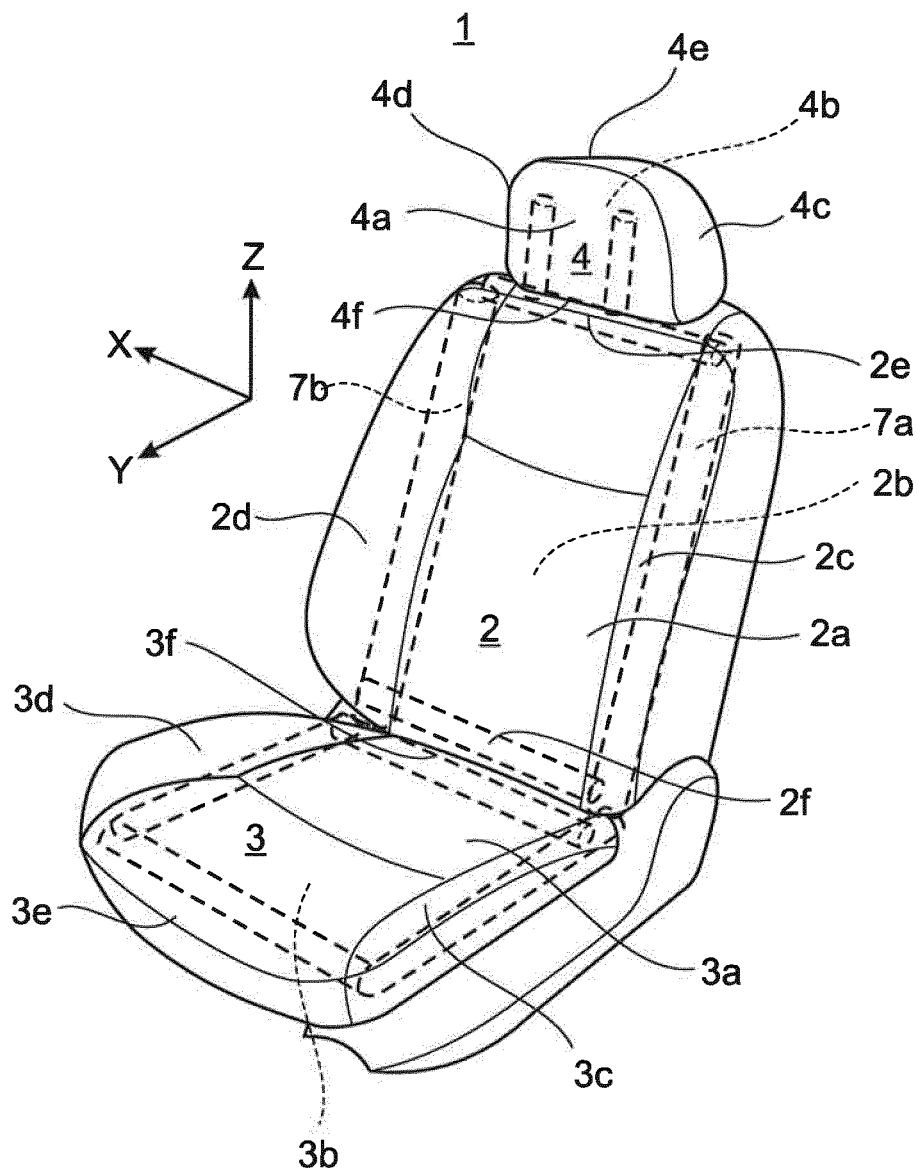

mounted to a vehicle seat, limit the lateral movement of the torso of an occupant and protect an occupant. The third portion will contribute with an increased stability of the air bag device when deployed. The air bag device may be adapted to protect the head of an occupant from injuries.

16 Claims, 3 Drawing Sheets

(51) Int. Cl.
    *B60R 21/235*     (2006.01)
    *B60R 21/26*     (2011.01)

(52) U.S. Cl.
    CPC ...... *B60R 21/26* (2013.01); *B60R 2021/2074* (2013.01); *B60R 2021/23146* (2013.01); *B60R 2021/23509* (2013.01); *B60R 2021/26058* (2013.01)

(56) References Cited

U.S. PATENT DOCUMENTS

| | | | |
|---|---|---|---|
| 10,112,570 B2 * | 10/2018 | Barbat | B60N 2/143 |
| 10,189,432 B2 * | 1/2019 | Matsushita | B60R 22/00 |
| 10,518,733 B2 * | 12/2019 | Dry | B60R 21/207 |
| 10,625,704 B2 * | 4/2020 | Dry | B60R 21/233 |
| 10,632,958 B2 * | 4/2020 | Dry | B60N 2/767 |
| 10,710,539 B2 * | 7/2020 | Cho | B60R 21/207 |
| 2009/0302584 A1 | 12/2009 | Sugimoto et al. | |
| 2019/0016293 A1 * | 1/2019 | Saso | B60R 21/207 |
| 2019/0275979 A1 * | 9/2019 | Dry | B60R 21/2338 |
| 2019/0389420 A1 * | 12/2019 | Dry | B60R 21/231 |
| 2020/0114857 A1 * | 4/2020 | Jaradi | B60R 21/207 |

FOREIGN PATENT DOCUMENTS

| | | | |
|---|---|---|---|
| GB | 2357999 A | 7/2001 | |
| WO | WO-2008018218 A1 | 2/2008 | |
| WO | WO-2015145285 A1 | 10/2015 | |
| WO | WO-2019235730 A1 * | 12/2019 | B60R 21/00 |

* cited by examiner

AIR BAG DEVICE AND VEHICLE SEAT PROVIDED WITH AN AIR BAG DEVICE

CROSS-REFERENCE TO RELATED APPLICATIONS

This application is a 371 U.S. National Phase of International Application No. PCT/EP2017/083175, filed Dec. 15, 2017, which claims priority to Swedish Patent Application No. 1651736-9, filed Dec. 22, 2016. The entire disclosures of the above applications are incorporated herein by reference.

DESCRIPTION OF INVENTION

The invention relates to an air bag device and a vehicle seat provided with such an air bag device. The air bag device is in particular intended to protect an occupant in a lateral direction relative the vehicle seat in case of an accident, e.g. a side collision.

In order to prevent injuries from lateral movements of an occupant in a vehicle seat, e.g. a driver seat or passenger seat, vehicles has been provided with so called inflatable curtains (IC). These ICs are usually mounted along the lateral sides of a vehicle above the doors. In case of an emergency, the inflatable curtains are deployed and injuries arising from hitting the side of the vehicle by the head or torso of an occupant are reduced. However, these ICs will only protect side movements of a body towards one side, i.e. the side of an occupant close to either outer side of a vehicle. In case an occupant is subject to forces acting in an opposite direction, i.e. towards the centre of a vehicle, will there be no protection from an inflatable curtain mounted along the side of a vehicle.

In order to improve the safety for forces working in both lateral directions it has been suggested to mount side air bag (SAB) devices on both sides of a vehicle seat in order to protect an occupant in case of side impacts. The SABs may be mounted to the seat such that an airbag device will deploy on each side of a vehicle seat. This is for example disclosed in U.S. Pat. No. 5,464,246 and WO 2008/018 218. Such devices are intended to protect an occupant in a vehicle seat from lateral motions both towards the centre of the vehicle and towards the lateral side.

The device in U.S. Pat. No. 5,464,246 may provide a stable structure due to its design with an air bag device attached at the upper portion of each lateral side of the backrest stretching towards an attachment point at the centre or front portion of the same lateral side of the seat cushion. However, these air bags seem not to provide a reliable support for the upper portion of a torso and/or the head due to its design. In WO 2008/018 218 and GB 2 357 999 are the air bags designed to cover essentially the complete torso of an occupant on both lateral sides of a seat. However, the design herein seems not to provide enough stable support especially for the head since these devices only are attached to a respective lateral portion of the back rest.

Hence, there is a need to provide an improved air bag device for a seat which in a better way may protect an occupant in the event of an impact subjecting the occupant of a seat to forces striving to move the occupant in a lateral direction relative the seat. In particular, the invention aims to solve the issue of providing an air bag device preventing or protecting from injuries from lateral movements in a seat even when there is no rigid support structure close to the seat where an air bag device may be mounted. In addition, the invention aims to provide an air bag device which will function also if the seat is relocated, e.g. is moved backwards, forwards or turned. The air bag device is meant to protect the torso and/or the head of an occupant when performing lateral movements, e.g. in the event of a side collision.

The present invention is thus directed to an airbag device and a vehicle seat provided with such an airbag device. The airbag device is designed to have a first air bag portion adapted to be attached to a first lateral backrest frame pillar located at or close to a first lateral side of a backrest and a second air bag portion to be attached to a second lateral backrest frame pillar located at or close to a second lateral side of a backrest. These portions are thus intended to be deployed such that they will protect the sides of a person seated in the vehicle seat and thus protect the torso of an occupant in case of lateral movement or impact. The first and second airbag portions may be designed to have at least one attachment point along its length for attachment to a lateral backrest frame pillar. Each of the first and second air bag portions are preferably designed to be provided with one or several attachment points for attachment to an upper portion of a lateral backrest frame pillar as well as one or several attachment points for attachment to a lower portion of the lateral backrest frame pillar.

The air bag device according to the invention is further provided with a third air bag portion. The first air bag portion and second air bag portion are connected with each other by the third air bag portion. The third air bag portion is designed to be located along at least a part of the upper portion of a backrest. The third air bag portion could be located along the whole length of the upper portion of a backrest or it could be designed to follow the shape of a headrest when mounted to a vehicle seat. In either case, the air bag device is designed to be mounted to a vehicle seat such that the first and second portions of the air bag will, when deployed, protect and/or limit the lateral movement of the torso of an occupant by providing a protective inflated air bag extending along the lateral sides of the backrest while the third portion of the air bag device will serve as a lateral stabilizing connector for the connected parts of the first and second portions when the airbag device is deployed. Connecting the first and second portions with each other will thus enable to use a stabilizing effect from both the first and second portion of the air bag device in case of an accident forcing an occupant to move towards either side of the seat.

The air bag device could be a tube comprising a rolled and/or folded air bag fabric.

The air bag device is preferably provided with a first inlet opening and a second inlet opening which are designed to primarily inflate the first air bag portion respectively the second air bag portion, e.g. by being located in the first air bag portion respectively the second air bag portion. In this case, the air bag device could be provided with a single gas generator connected to both inlet openings in the air bag. Alternatively, the air bag device could be provided with a first gas generator and a second gas generator connected to the first inlet opening respectively the second inlet opening in the air bag device. The airbag device could of course be provided with further openings, e.g. an additional opening in the third air bag portion, connected to an additional gas generator or using the same as is used for the other openings. Due to the large size and volume of the air bag device to be inflated will the use of one single inlet opening in general cause an undesired delay in the inflation of the device. However, a single inlet may work satisfactorily if an increased inflation time is allowed and in some cases it could even be an advantage if it is desired to fill the air bag portions sequentially, e.g. inflating the air bag portion at the near side (door side) first, thereafter the central portion in the head area where after the side air bag portion of the far side (central side) is inflated.

In any of the inflation arrangements described above could the air bag device be provided with one or several gas guides connecting the gas generator or gas generators with one or several inlet openings such as the first inlet opening or the second inlet opening. It shall be noted, one gas generator may be connected to one or several inlet openings via one or several gas guides. In addition, one gas generator may be directly connected to one inlet opening and connected via one or several gas guides to one or several inlet openings. The gas guide could be made of fabric and/or metal.

The air bag device described above is intended to be mounted to a vehicle seat. An advantage by mounting the air bag device to a seat is that the positioning of the air bag device relative the seat will not change if the position of the seat is changed e.g. moved forward or backwards or turned. In addition, if there is no supporting structure close to the seat where an air bag device is desired it may be difficult to protect certain areas by an air bag device.

Hence, the invention further relates to a vehicle seat provided with an air bag device. The vehicle seat comprises a backrest, a seat cushion and a headrest. The seat is defined to have a forward direction pointing from the backrest towards the space where an occupant is intended to be seated. Another way of explaining the forward direction is the direction in which an occupant is looking when seated normally in the vehicle, e.g. towards the front window when a seat is normally located in a vehicle. The backrest has a front side intended to be in contact with and facing towards an occupant seated in the vehicle seat and a back side facing away from an occupant seated in the vehicle seat. The backrest further comprises a first lateral portion and a second lateral portion located at the sides of the backrest stretching from close to the head rest to the seat cushion. The backrest also comprises an upper portion close to the head rest and a lower portion close to the seat cushion. The seat cushion has an upper side intended to be in contact with and facing towards an occupant seated in the vehicle seat and a lower side facing away from an occupant seated in said vehicle seat. The seat cushion further has a first lateral portion and a second lateral portion located at the lateral sides of the seat cushion. The seat cushion further comprises a back portion at its side closest to the backrest and a front portion which is located at the side of the seat cushion furthest away from the backrest. The headrest comprises a front side intended to be in contact with and facing towards a head of an occupant seated in the vehicle seat and a back side facing away from a head of a person seated in the vehicle seat. The head rest further comprises a first lateral portion and a second lateral portion which are essentially parallel to the lateral portions of the backrest. The headrest also comprises a lower portion at the side closest to the backrest and an upper portion located at the opposite side of the headrest which is furthest away from the backrest. The vehicle seat is provided with an airbag device, e.g. such a device as disclosed herein. The airbag device is attached to a loadbearing seat framework. A first air bag portion is attached to a first lateral backrest frame pillar located at or close to the first lateral side of the backrest. A second air bag portion is attached to a second lateral backrest frame pillar located at or close to the second lateral side of the backrest.

The airbag device comprised in the vehicle seat is designed to comprise a third airbag portion. The first air bag portion and second air bag portion are connected with each other by the third air bag portion. The third airbag portion is located along at least a part of the upper portion of the backrest. The air bag device is thus located along portions of the outer contour of the vehicle seat. The air bag is designed and mounted to the vehicle seat such that the first and second portions of the air bag will deploy in a forward direction from the lateral portions of the backrest in order to limit the lateral movement of the torso of an occupant. The third portion of the air bag is designed and mounted to the vehicle seat such that it will extend, when deployed, in a forward direction from above and/or on the sides of the head rest, e.g. such that the deployed third portion will be located above and/or on the sides of a head of an occupant in the seat. It may even be possible to design the third portion of the air bag device to deploy to protect the face of an occupant, i.e. to have a portion of the air bag to be located in front of the head when the air bag is deployed.

The purpose of the design of the airbag device and how it is mounted to the vehicle seat is to provide a stable structure which prevents injuries when an occupant is moving in lateral directions in the seat, e.g. due to a side collision. A purpose of the third portion of the air bag device is to provide increased stability of the upper parts of the first and second air bag portions of the airbag device. By connecting these devices these portions may stabilize each other. In the lower parts stabilizing of the first and second air bag portions may be achieved by attaching the lower ends to the lateral sides of the seat cushion. The third portion may also be designed and used to protect the head from injuries when deployed.

The third air bag portion of the air bag device may in addition to be located along a part of the upper portion of the backrest continue and follow along the lateral portions and upper portion of the head rest. Hence, the air bag could be located along the outer contour of the backrest and the head rest. The third air bag portion could thus be designed and mounted to the backrest and headrest such that the third air bag portion will deploy in a forward direction from the upper portion of the backrest and the lateral portions and upper portion of the head rest. However, the head rest should in this case comprise a rigid and stable structure for attaching the third air bag portion thereto.

Alternatively, the third air bag portion could be designed to be mounted such that it essentially follows the upper portion of the backrest at or close to the back side of the backrest. It may thus comprise a portion which is mounted and designed to be deployed first upwards along the backside of the headrest and thereafter deploy and stretching forward on the sides of the lateral portions and above the upper portion of the head rest. The third air bag portion may thus have a configuration when deployed such that the third air bag portion will have a hood like shape encompassing an occupants head on the sides and above.

The air bag device may be attached to the vehicle seat by several attachment points located along each one of the lateral backrest frame pillars. In general, there is at least one attachment point in the upper portion as well as at least one attachment point in the lower portion of the backrest on each one of the lateral backrest pillars. In addition, the air bag device may be attached to the vehicle seat along the lateral portions and/or the upper portion of the head rest.

The air bag device could additionally be provided with straps or tethers attached to the vehicle seat in order to further improve the stability. For example, there may be a strap connected between the upper part of the first and/or second air bag portions to an attachment point on the head rest or to the upper portion of the back rest. There could also be a strap connected to the lower part of the first and/or second air bag portions to the seat cushion.

The first air bag portion and second air bag portion could be attached to the respective lateral seat frame pillars on the inside, i.e. on the side facing towards the centre of the seat. This will aid in supporting and stabilizing the first and second air bag portion from lateral forces from an occupant moving towards either side. However, the first and second air bag portion may also be attached on the outer side of the lateral seat frame pillars. The mounting of the air bag device may be decided considering how much the first and second air bag portions should be spaced apart from each other. It could also be possible to have one portion, e.g. the first air bag portion, mounted to the inside, and another portion, e.g. the second air bag portion, mounted to the outside.

In order to improve the stability of the air bag, the first and second portions of the air bag device could extend further and be attached on the respective lateral sides of the vehicle seat to a frame structure in the first lateral portion and second lateral portion of the seat cushion.

In case the vehicle seat is arranged such that its parts, e.g. the backrest, seat cushion and head rest, may be moved or adjusted relative each other could the air bag device be adapted to these adjustments. The air bag device could be foldably attached in its longitudinal direction in the regions where the air bag is stretching from one part to another part of the vehicle seat such that the folded portions allows a stretching of the air bag device when two parts are moved apart. In order to stabilize also these portions and assure a proper configuration of the air bag, these portions could be attached to a foldable bracket or the like.

The vehicle seat could be provided with a second air bag device located in the front portion of the seat cushion. The second air bag device will thus function so as to raise the front portion of the seat cushion. The purpose of such an air bag is to aid in keeping a person seated in the seat in a proper position and avoid an occupant from moving forwards in the seat. This second air bag device is preferably connected with a gas guide connected to a gas generator which is also used for the first air bag device or a separate gas generator.

The use of an air bag device mounted in a vehicle seat may be in particular useful if the vehicle seat is rotatable. If the air bag device is mounted to the vehicle will its position relative the seat change as the seat is rotated and possibly not protect an occupant in a proper way. This is most commonly occurring for passenger seats in mini buses or caravans today. However, this may be desired for other kinds of vehicles in the near future as autonomous driving vehicles or vehicle trains where a multitude of vehicles makes up a platoon will become more frequently used. In these cases it could be desired to be able to rotate also a driver's seat to achieve a more comfortable position when the vehicle is driving in an autonomous mode.

FIG. 1 discloses an isomeric view of a vehicle seat

Figure 2:
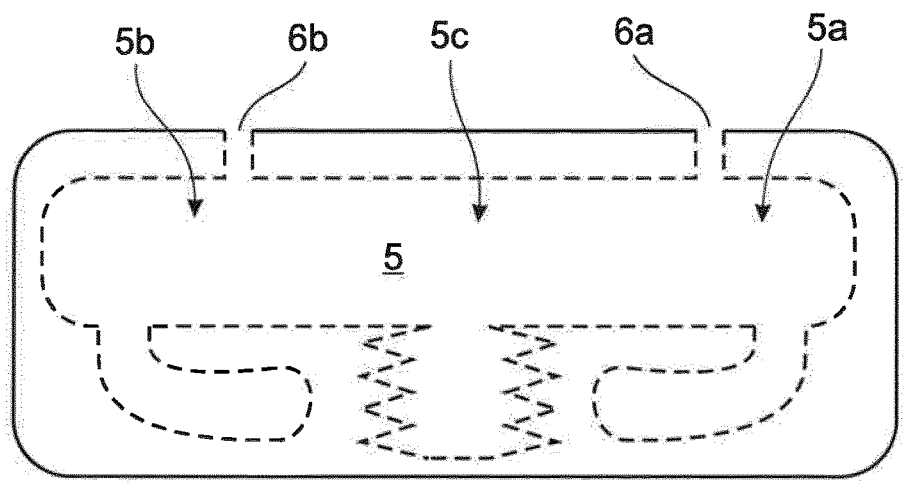

FIG. 2 discloses an air bag device

Figure 3:
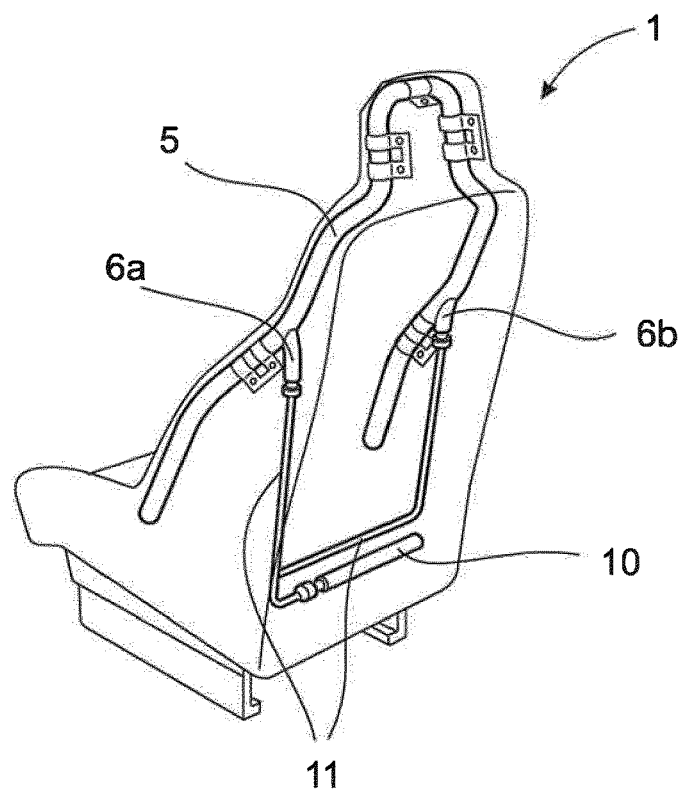
Figure 4:
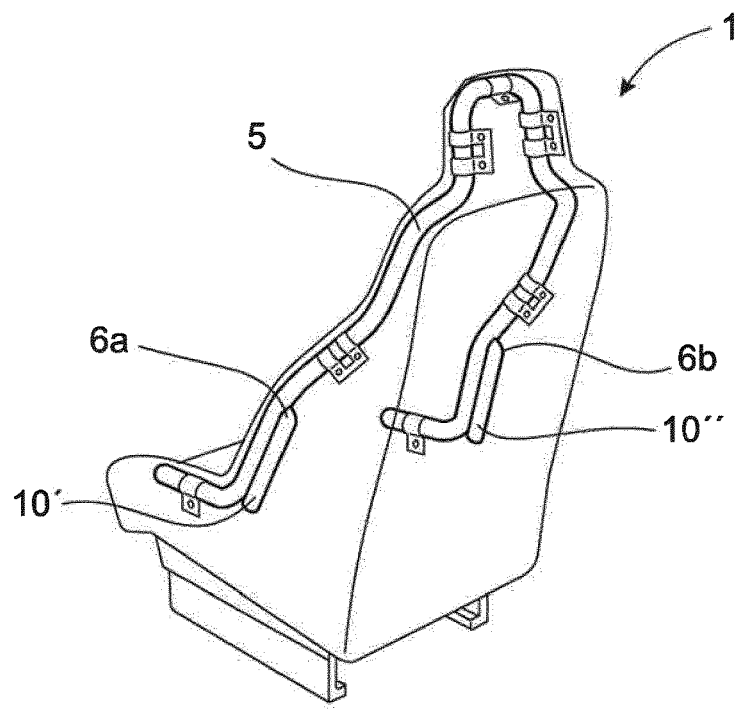
Figure 5:
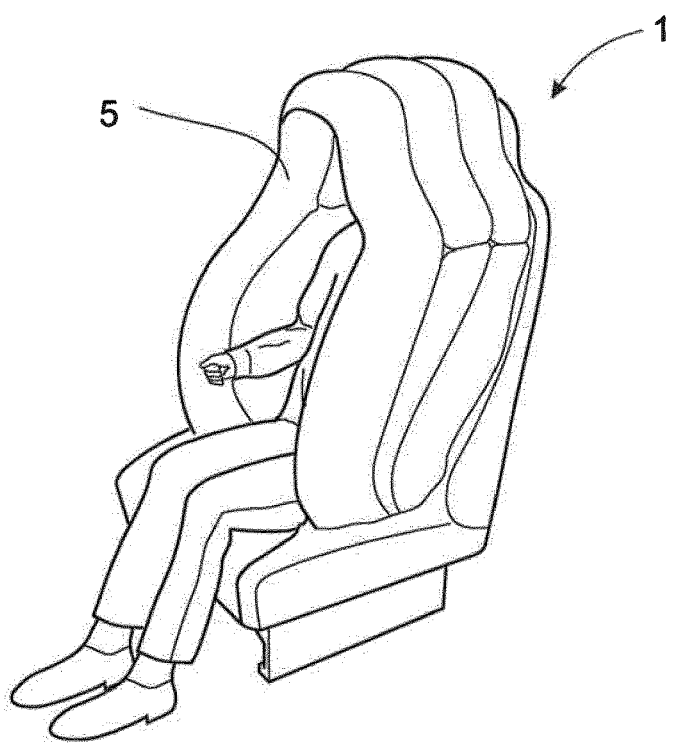

FIG. 3 discloses a vehicle seat provided with an air bag device connected to an inflating system FIG. 4 discloses a vehicle seat provided with an air bag device connected to an alternative inflating system FIG. 5 discloses a vehicle seat and air bag device when inflated In FIG. 1 is disclosed a vehicle seat 1. The seat could for example be used as a driver's seat. The seat comprises three main parts which are a backrest 2, a seat cushion 3 and a head rest 4. The backrest 2 comprises a front side 2a facing towards an occupant seated in the vehicle seat 1 and a back side facing away from an occupant seated in the vehicle seat. The backrest further comprises a first lateral portion 2c and a second lateral portion 2d, an upper portion 2e close to the head rest 4 and a lower portion 2f close to the seat cushion 3. The seat cushion 3 comprises an upper side 3a intended to be in contact with and facing towards an occupant seated in the vehicle seat 1 and a lower side 3b facing away from an occupant. The seat cushion comprises a first lateral portion 3c, a second lateral portion 3d, a front portion 3e and a back portion 3f close to the backrest 2. The headrest comprises a front side 4a intended to be in contact with and facing towards a head of an occupant seated in the vehicle seat and a back side 4b facing the opposite way 1. The head rest 4 further comprises a first lateral portion 4c and a second lateral portion 4d. The head rest also comprises a lower portion 4f close to the backrest and an opposite upper portion 4e. The vehicle seat also comprises a loadbearing seat framework (marked with dotted lines) whereof a first lateral backrest frame pillar 7a is located along the first lateral portion 2c of the backrest 2 and a second lateral backrest frame pillar 7b is located along the second lateral portion 2d of the backrest 2. The seat framework 7 is suitable to be used for attachment of an air bag device to the seat 1.

In FIG. 2 is disclosed an air bag device 5 adapted to be mounted to a vehicle seat. The air bag device 5 comprises a first air bag portion 5a which suitably may be attached to a first lateral backrest frame pillar 7a (see FIG. 1) and a second air bag portion 5b which suitably may be attached to the second lateral backrest frame pillar 7b. The first and second air bag portions 5a, 5b are connected to each other by a third air bag portion 5c. The third air bag portion 5c is intended to be located close to the upper portion 2e of the backrest 2 (see FIG. 1). The air bag device is further provided with a first inlet opening 6a and a second inlet opening 6b. Since the volume of the air bag device 5 is rather big when inflated is it advantageous to provide the air bag device with at least two inlet openings 6a, 6b in order to be able to inflate the air bag device rapidly.

FIG. 3 discloses a vehicle seat 1 provided with an air bag device 5. The first air bag portion 5a is attached along the first lateral side 2c of the backrest 2 and the second airbag portion 5b is attached along the second lateral side 2d of the backrest. The third air bag portion 5c is mounted to essentially follow the contour of the upper portion 2e of the backrest 2 and the headrest 4. In this embodiment is the inflating of the air bag device provided for by one single gas generator 10 which is connected to the inlet openings 6a, 6b via a system of gas guides 11 located on the back side 2b of the backrest 2.

FIG. 4 discloses the vehicle seat 1 as described in FIG. 3 but with a modified inflating system for inflation of the air bag device 5. In this figure there are a first gas generator 10' and a second gas generator 10" connected to the first inlet opening 6a respectively the second inlet opening 6b. The gas generators 10', 10" are connected directly to the respective inlet openings 6a, 6b such that there is no need for gas guides.

The air bag device 5 in FIG. 4 differs in it design somewhat from the design in FIG. 3 in that the device in FIG. 3 is only stretching along and attached to the backrest 2 while the air bag device 5 in FIG. 4 continues further and is also attached along the sides of the seat cushion 3.

In FIG. 5 is disclosed the vehicle seat 1 when the air bag device 5 has been inflated. The air bag device 5 has thus deployed such that it forms a protective shield on the sides and above an occupant in the seat 1.

The embodiments disclosed above in FIGS. 1 to 5 only serves as some examples of how the invention may be realized. It is obvious the skilled person may modify the invention by alternative designs.

The invention claimed is:

1. An air bag device in combination with a vehicle seat, the vehicle set having a backrest, a seat cushion and a head rest, the seat having a forward direction pointing from the backrest towards a space where an occupant is intended to be seated, the backrest having a front side intended to be in contact with and facing towards the occupant seated in the vehicle seat, a back side facing away from the occupant seated in the vehicle seat and a first lateral portion, a second lateral portion, an upper portion close to the head rest and a lower portion close to the seat cushion, the seat having an upper side intended to be in contact with and facing towards the occupant seated in the vehicle seat and a lower side facing away from the occupant seated in the vehicle seat and a first lateral portion, a second lateral portion, a front portion and a back portion close to the backrest and the head rest having a front side intended to be in contact with and facing towards a head of the occupant seated in the vehicle seat, a back side facing away from a head of the occupant seated in the vehicle seat and a first lateral portion, a second lateral portion, an upper portion and a lower portion close to the backrest, the air bag device comprising:
   a first air bag portion attached to a first lateral backrest frame pillar located at or close to a first lateral side of the backrest; and
   a second air bag portion to be attached to a second lateral backrest frame pillar located proximate to a second lateral side of the backrest,
   wherein the first air bag portion and second air bag portion are connected to each other by a third air bag portion located along a part of an upper portion of the backrest, the air bag mounted to the vehicle seat such that the first and second portions of the air bag, when deployed, limit the lateral movement of a torso of the occupant, and
   wherein the first and second portions of the air bag device are deployable in a forward direction from the lateral portions of the backrest and the third portion of the air bag device deploys in the forward direction to a location selected from above the head rest, to the sides of the head rest and combinations thereof and the third portion extends in the forward direction father than the head rest.

2. The air bag device in combination with the vehicle seat according to claim 1, wherein the air bag device is a tube comprising at least one of a rolled air bag fabric and a folded air bag fabric.

3. The air bag device in combination with the vehicle seat according to claim 1, wherein the air bag device is provided with a first inlet opening and a second inlet opening in the first and second air bag portions, respectively.

4. The air bag device in combination with the vehicle seat according to claim 3, wherein the air bag device is provided with a single gas generator connected to both inlet openings in the air bag device.

5. The air bag device in combination with the vehicle seat according to claim 3, wherein the air bag device is provided with a first gas generator connected to the first inlet opening and a second gas generator connected to the second inlet opening in the air bag device.

6. The air bag device in combination with the vehicle seat according to claim 4, further comprising at least one gas guide made of fabric or metal, the at least one gas guide connecting the gas generator with the first inlet opening and the second inlet opening.

7. The airbag device in combination with the vehicle seat according to claim 1, wherein the third air bag portion in addition to being located along a part of the upper portion of the backrest continues and follows along the lateral portions and upper portion of the head rest such that the air bag is located along an outer contour of the backrest and the head rest, the third air bag portion designed and mounted to the backrest and headrest such that the third air bag portion will deploy in a forward direction from the upper portion of the backrest and the lateral portions and upper portion of the head rest.

8. The airbag device in combination with the vehicle seat according to claim 1, wherein the third air bag portion essentially follows the upper portion of the backrest at or close to the back side and comprises a portion which is mounted and designed to be deployed in an upwards direction along a back side of the head rest and thereafter stretching forward from the lateral portions and upper portion of the head rest such that the third air bag portion will have a hood like shape encompassing the occupants head on the sides and above.

9. The airbag device in combination with the vehicle seat according to claim 7, wherein the air bag device is attached to the vehicle seat by several attachment points located along each one of the lateral backrest frame pillars in the upper portion as well as in the lower portion of the backrest and along the lateral portions of the head rest and the upper portion of the head rest.

10. The vehicle seat according to claim 1, wherein the first air bag portion and the second air bag portion are attached on an inside facing towards a center of the seat, of respective lateral seat frame pillars.

11. The airbag device in combination with the vehicle seat according to claim 1, wherein the air bag device is also extending to and attached to the first lateral portion and second lateral portion of the seat cushion.

12. The airbag device in combination with the vehicle seat according to claim 1, wherein the air bag device is foldably attached in a longitudinal direction thereof in regions where the air bag device is stretching from one part to another part of the vehicle seat.

13. The airbag device in combination with the vehicle seat according to claim 1, wherein the vehicle seat includes a second air bag device located in the front portion of the seat cushion, the second air bag device provided with a gas guide connected to the same gas generator or a separate gas generator.

14. The airbag device in combination with the vehicle seat according to claim 1, wherein the vehicle seat is rotatable.

15. An air bag device in combination with a vehicle seat, the vehicle seat having a backrest, a seat cushion and a head rest, the air bag device comprising:
   a first air bag portion attached to a first lateral backrest frame pillar located proximate to a first lateral side of the back rest; and
   a second air bag portion to be attached to a second lateral backrest frame pillar located proximate to a second lateral side of the back rest,
   wherein the first air bag portion and second air bag portion are connected to each other by a third air bag portion located along a part of an upper portion of the backrest, the air bag mounted to the vehicle seat such that the first and second portions of the air bag, when deployed, limit the lateral movement of a torso of the occupant, and wherein the first and second portions of the air bag device are deployable in a forward direction from the lateral portions of the backrest and the third portion of the air bag device deploys in a forward direction to a location selected from above the head rest, to the sides of the head rest and combinations thereof and the third portion extends in the forward direction farther than the head rest.

16. An air bag device in combination with a vehicle seat, the vehicle seat having a backrest, a seat cushion and a head rest, the air bag device comprising:
- a first air bag portion attached to a first lateral backrest frame pillar located proximate to a first lateral side of the back rest;
- a second air bag portion to be attached to a second lateral backrest frame pillar located proximate to a second lateral side of the back rest; and
- a third air bag portion connecting the first air bag portion and second air bag portion, the third air bag portion deployable from the vehicle seat to a deployed position in which a central portion of the third airbag portion is disposed above the head rest and extends in a forward direction farther than the head rest.

* * * * *